United States Patent
Yang et al.

(10) Patent No.: US 9,878,661 B2
(45) Date of Patent: Jan. 30, 2018

(54) ROAD SAFETY VEHICLE WARNING DEVICE

(71) Applicant: HON HAI PRECISION INDUSTRY CO., LTD., New Taipei (TW)

(72) Inventors: Tzu-Cheng Yang, New Taipei (TW); Hung-Chun Lu, New Taipei (TW); Yu-Chien Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 21 days.

(21) Appl. No.: 15/142,284

(22) Filed: Apr. 29, 2016

(65) Prior Publication Data

US 2017/0305337 A1    Oct. 26, 2017

(30) Foreign Application Priority Data

Apr. 26, 2016  (TW) ............... 105113006 A

(51) Int. Cl.
*B60Q 1/52*  (2006.01)
*B60Q 1/26*  (2006.01)

(52) U.S. Cl.
CPC ............. *B60Q 1/52* (2013.01); *B60Q 1/2696* (2013.01)

(58) Field of Classification Search
CPC ................................ B60Q 1/52; B60Q 1/2696

USPC .......................................................... 340/473
See application file for complete search history.

(56) References Cited

U.S. PATENT DOCUMENTS

| | | | | |
|---|---|---|---|---|
| 4,232,466 | A * | 11/1980 | Mathis | E01F 13/02 40/610 |
| 4,403,565 | A * | 9/1983 | Bleiweiss | B60Q 7/005 116/63 P |
| 5,041,813 | A * | 8/1991 | Chang | B60Q 7/00 340/472 |
| 6,463,687 | B1 * | 10/2002 | Dorstewitz | G09F 15/0062 248/171 |
| 9,601,012 | B2 * | 3/2017 | Williams | G08G 1/07 |
| D787,968 | S * | 5/2017 | Wu | D10/113.4 |
| 2005/0108911 | A1 * | 5/2005 | Perelli | G09F 15/0062 40/610 |
| 2015/0218833 | A1 * | 8/2015 | Ballantyne | A61G 10/005 52/79.1 |
| 2016/0122956 | A1 * | 5/2016 | Christiansen | B60P 3/0255 180/2.2 |

* cited by examiner

*Primary Examiner* — Nader Bolourchi
(74) *Attorney, Agent, or Firm* — ScienBiziP, P.C.

(57) ABSTRACT

A road traffic warning device includes a base, a cover body mounted on the base, and a collapsible warning frame mounted to the cover body. The base includes a controlling module. A folded triangular collapsible warning frame can be unfolded out of the cover body to create the warning device. Two wheels are mounted to two side of the base. The controlling module is configured to control the wheels to move the warning device to an effective warning position.

18 Claims, 4 Drawing Sheets

ROAD SAFETY VEHICLE WARNING DEVICE

FIELD

The subject matter herein generally relates to a road safety vehicle warning device.

BACKGROUND

When a car breaks down on the road, a warning device is needed to be placed on a road, etc., to warn other road users.

BRIEF DESCRIPTION OF THE DRAWINGS

Implementations of the present technology will now be described, by way of example only, with reference to the attached figures.

DETAILED DESCRIPTION

Figure 1:
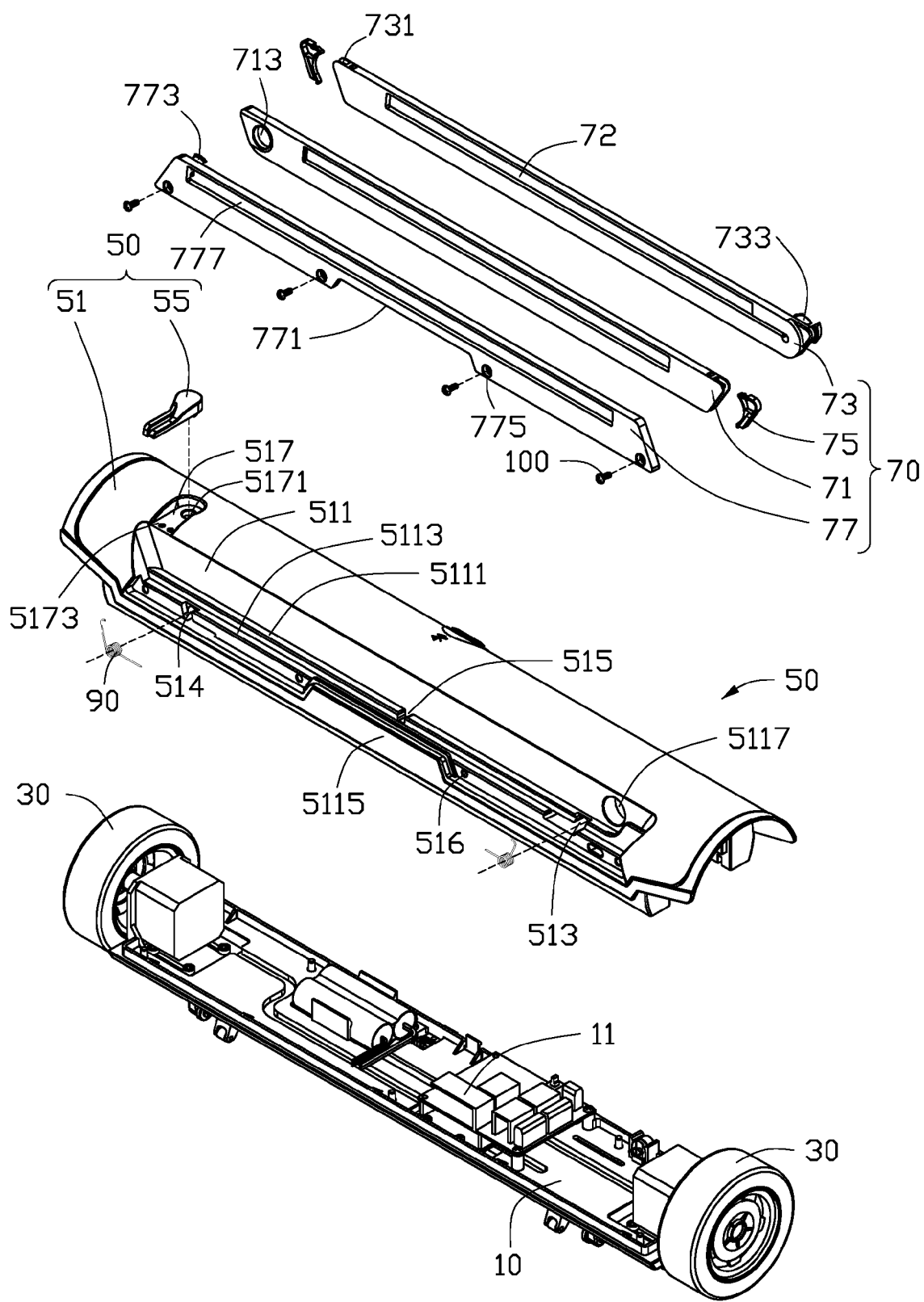
FIG. 1 is an exploded, isometric view of an exemplary embodiment of a warning device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like. The use of adjectives of orientation such as "left(end or side of component)" or "right(end or side of component)" is for the purposes of specificity and consistency of indentation and unless otherwise stated does not signify any special constructional or functional purpose in the component or element.

The present disclosure relates to a road traffic warning device.

Figure 2:
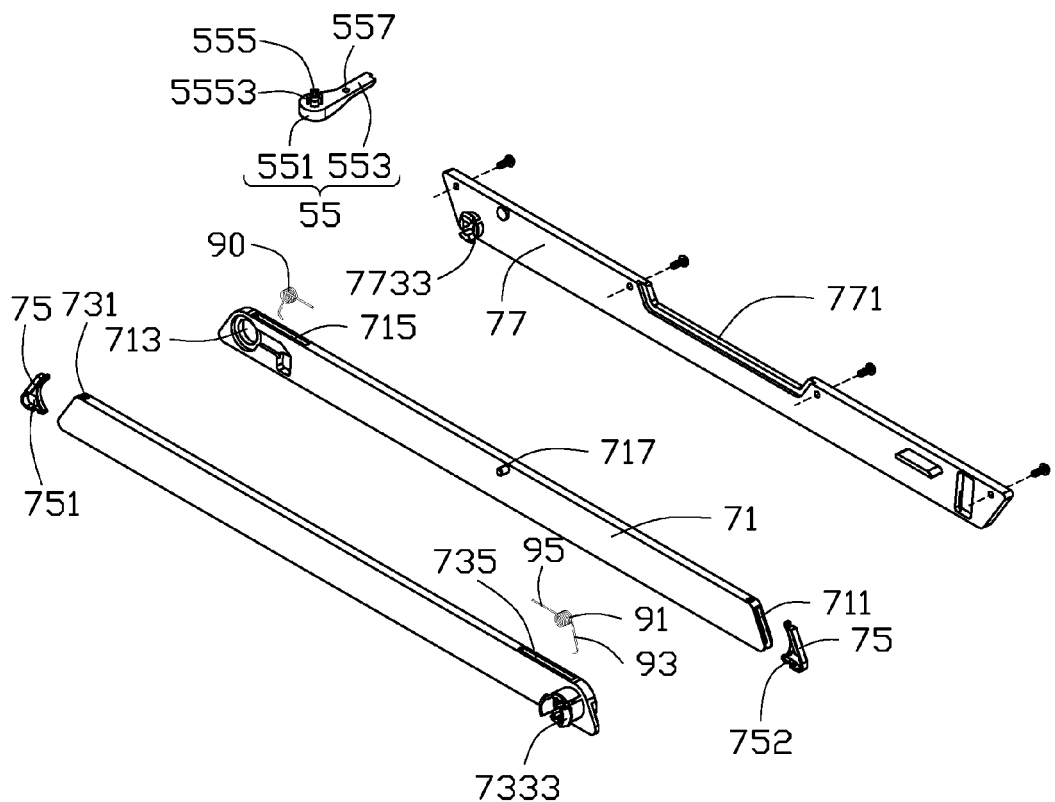
FIG. 2 is an exploded, partially enlarged view of the warning device of FIG. 1, but viewed from another aspect.

Referring to FIGS. 1-2, the warning device of the disclosure comprises a base 10, two wheels 30 mounted to two sides of the base 10, a cover body 50 mounted on the base 10, a collapsible warning frame 70, and two resilient members 90.

A controller 11 (e.g. motor) is mounted to the base 10, and the controller 11 is configured to control the wheels 30 to move.

The cover body 50 comprises a substantially semi-cylindrical cover 51, and an operating device 55 mounted on a top of the cover 51. An outside of the cover 51 defines a indentation 511. A first raised platform 5111 is formed at a side wall of the indentation 511. A second raised platform 5113 is formed at a front wall of the first raised platform 5111, and the second raised platform 5113 is located below the first raised platform 5111. A knob 5115 protrudes from a front side of a middle portion of the indentation 511. A right end of the second raised platform 5113 defines a first receiving slot 513 running through the first raised platform 5111. A left end of the second raised platform 5113 defines a second receiving slot 514. A middle portion of the first raised platform 5111 defines a locking slot 515. A front wall of the second raised platform 5113 defines a plurality of screw holes 516. A left end of the cover 51 defines a recess 517 communicating with the indentation 511. A bottom wall of the recess 517 defines a first locking hole 5171, and two spaced second locking holes 5173 in front of the first locking hole 5171. The right end of the indentation 511 defines a mounting hole 5117.

The operating device 55 comprises a head portion 551 and an operating portion 553 coupled to the head portion 551. In at least one exemplary embodiment, the head portion 551 is substantially cylindrical, and the operating portion 553 is substantially lever-shaped. A post 555 protrudes from a bottom of the head portion 551. A protrusion 557 protrudes from a bottom of the operating portion 553. The post 555 comprises a plurality of spaced elastic hooks 5553 extending from the bottom of the head portion 551.

The collapsible warning frame 70 comprises a fixing plate 77, a first frame 71, a second frame 73 and two positioning blocks 75. In at least one exemplary embodiment, the fixing plate 77, the first frame 71, and the second frame 73 are each substantially trapezoidal. A right end of the first frame 71 defines a substantially L-shaped first positioning slot 711 along a top wall and a right side wall of the first frame 71. A left end of the first frame 71 defines a through hole 713. A bottom wall of the left end of the first frame 71 defines a first notch 715. A post 717 protrudes from a rear side of the first frame 71. A left end of the second frame 73 defines a substantially L-shaped second positioning slot 731 along a top wall and a left side wall of the second frame 73. A post 733 protrudes from a right end of the second frame 73, and the post 733 comprises a plurality of spaced elastic hooks 7333 extending from a rear side wall of the second frame 73. A bottom wall of the right end of the second frame 73 defines a second notch 735. Each front side wall of the first frame 71 and the second frame 73 defines a groove 72. The two positioning blocks 75 are substantially L-shaped. Each positioning block 75 defines a receiving hole 751, and a magnet 752 is mounted in the receiving hole 751. A bottom end of the middle of the fixing plate 77 defines a locking recess 771. A post 773 protrudes from a left end of the fixing plate 77.

The post 773 comprises a plurality of spaced elastic hooks 7733 extending from the fixing plate 77. A lower portion of the fixing plate 77 defines a plurality of spaced screw holes 775. A front side of the fixing plate 77 defines a longitudinal groove 777.

In at least one exemplary embodiment, the two resilient members 90 are torsion springs. Each resilient member 90 comprises a resilient portion 91, a first resilient rod 93 coupled to one end of the resilient portion 91, and a second resilient rod 95 coupled to the other end of the resilient portion 91.

Figure 3:
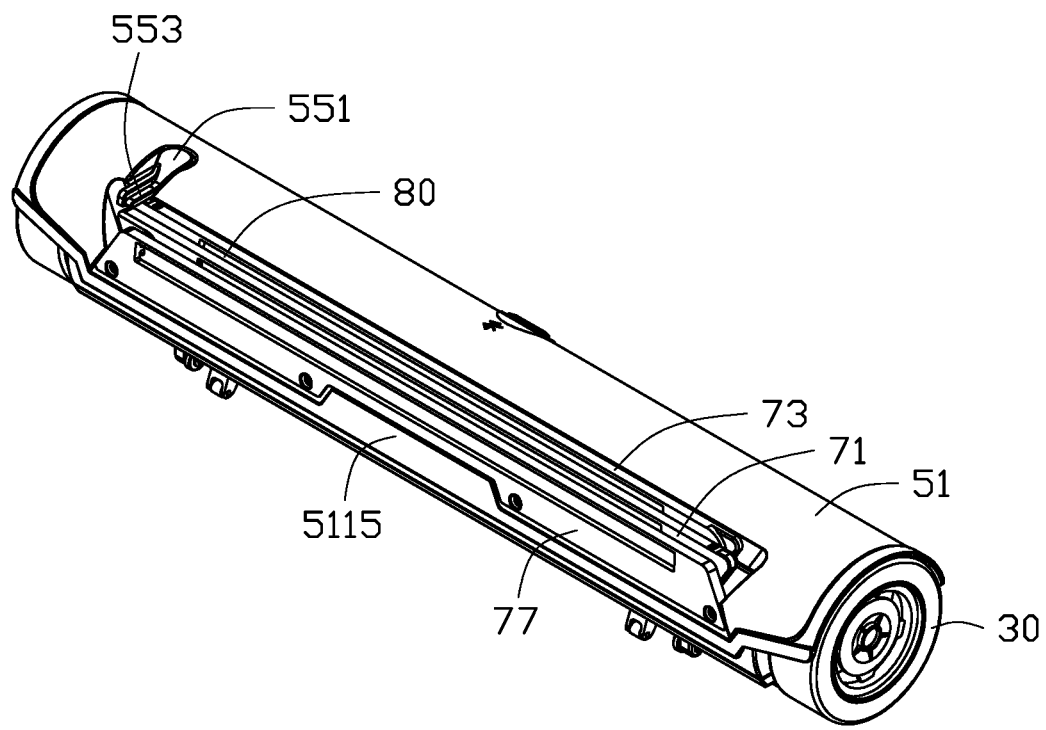
FIG. 3 is an assembled, isometric view of the warning device of FIG. 1.

Referring to FIG. 3, to assemble the warning device, the two resilient members 90 are inserted in the first receiving slot 513 and the second receiving slot 514. The resilient portions 91 and second resilient rods 95 of the two resilient members 90 are respectively received in the first receiving slot 513 and the second receiving slot 514. The first resilient rod 93 of one resilient member 90 applies force to the front side wall of the first raised platform 5111, and the first resilient rod 93 of the other resilient member 90 applies force to the front side wall of the second raised platform 5113. A positioning block 75 is mounted in the first positioning slot 711 and in the second positioning slot 731. The through hole 713 of the first frame 71 aligns with the post 773 of the fixing plate 77, the first frame 71 is moved toward the post 773 of the fixing plate 77, and the hooks 7733 are deformed to pass through the through hole 713 of the first frame 71. The hooks 7733 then restore elastically and hook onto the rear side wall of the first frame 71, the first frame 71 then being rotatably coupled to the fixing plate 77. The knob 5115 of the cover 51 is locked in the locking recess 771 of the fixing plate 77. The first resilient rod 93 of one resilient member 90 is compressed and received in the first notch 715 of the first frame 71. The post 717 of the first frame 71 is locked in the locking slot 515 of the first raised platform 5111, and the first frame 71 is located on the top of the second raised platform 5113. A number of screws 100 are passed through the screw holes 775 of the fixing plate 77, to be fastened in the screw holes 516 of the second raised platform 5113. The fixing plate 77 is coupled to the cover 51. The post 733 of the second frame 73 aligns with the mounting hole 5117 of the cover 51. The second frame 73 is moved toward the mounting hole 5117, and the first resilient rod 93 of the other resilient member 90 is compressed to be received in the second notch 735 of the second frame 73. The hooks 7333 are deformed to pass through the mounting hole 5117 of the cover 51, the hooks 7333 then restore to hook the outside of the mounting hole 5117. The second frame 73 is located on the top of the first raised platform 5111, and the second frame 73 is rotatably coupled to the cover 51. The post 555 of the operating device 55 is aligned with the first locking hole 5171 of the cover 51, and the protrusion 557 of the operating device 55 is aligned with the right second locking hole 5173 of the cover 51. The operating device 55 is moved toward the recess 517, the hooks 5553 are deformed to pass through the first locking hole 5171, the hooks 5553 then restore to hook the outside of the first locking hole 5171. The protrusion 557 is thereby locked in the right second locking hole 5173. The operating portion 553 of the operating device 55 presses against the top of the collapsible warning frame 70, the collapsible warning frame 70 is folded and received in the cover 51. The cover 51 is mounted on the base 10. A number of warning features, such as high-visibility indicators (LEDs 80) are mounted in the grooves 777 and 72.

Figure 4:
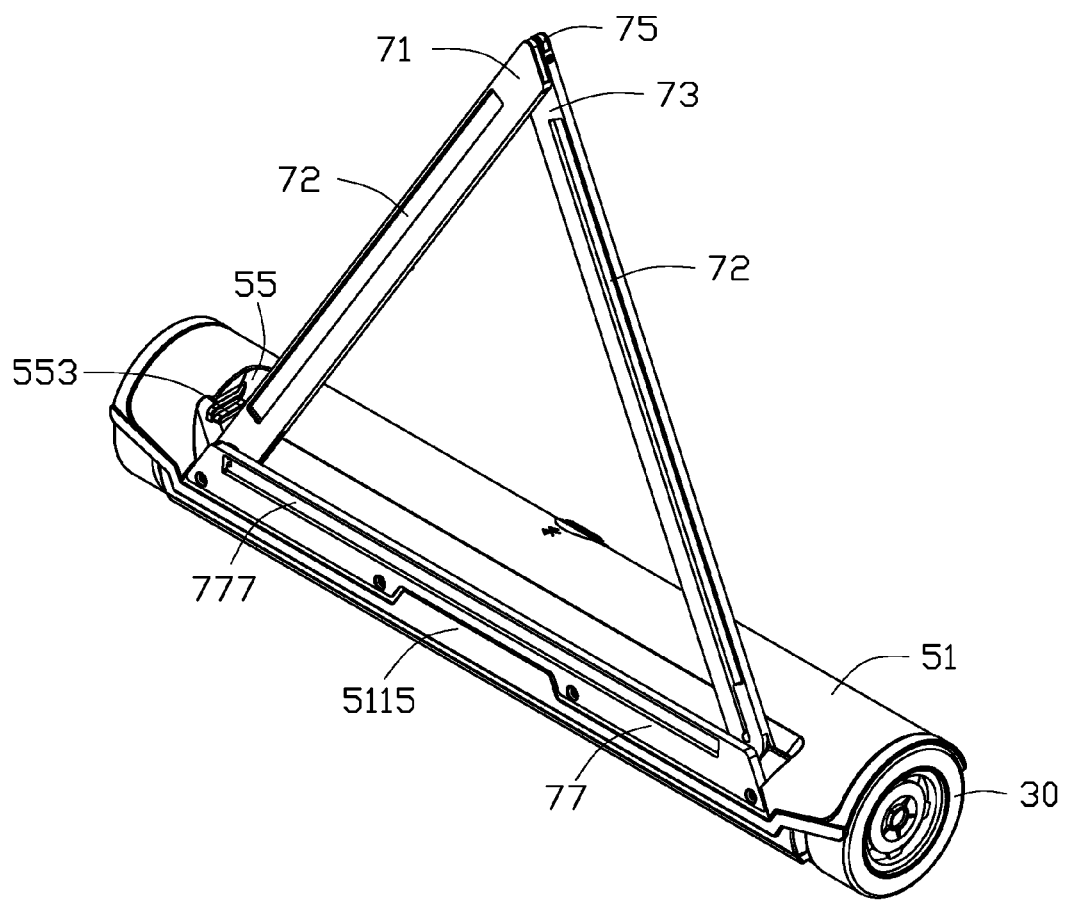
FIG. 4 is an assembled, isometric view of the warning device of FIG. 1, shown in a working state.

Referring to FIG. 4, when the warning device is being used, the operating portion 553 is rotated, and the protrusion 557 of the operating device 55 is locked in the left second locking hole 5173. The operating device 55 is separated from the collapsible warning frame 70. The resilient members 90 restore, and the first frame 71 and the second frame 73 spring upward. The second frame 73 moves up along the post 717 until the top end of the first frame 71 is coupled to the second frame 73, and the magnets 752 in the positioning blocks 75 are close enough to attract each other. The first frame 71 and the second frame 73 are positioned, and a triangle is cooperatively formed by the fixing plate 77, the first frame 71, and the second frame 73. The controller 11 is controlled by a terminal device, and the controller 11 controls the warning device to move to a preset position. Other road traffic can easily see the warning given by the LEDs 80.

The embodiments shown and described above are only examples. Even though numerous characteristics and advantages of the present technology have been set forth in the foregoing description, together with details of the structure and function of the present disclosure, the disclosure is illustrative only, and changes may be made in the details, including matters of shape, size, and arrangement of the parts within the principles of the present disclosure, up to and including the full extent established by the broad general meaning of the terms used in the claims.

What is claimed is:

1. A warning device comprising:
a base comprising a controller;
a cover body mounted to the base; and
a collapsible warning frame mounted to the cover body, and capable of being folded in the cover body in a first position and unfolded out of the cover body in a second position;
wherein two wheels are mounted to two side of the base, the controller is configured to control the wheels to move the warning device, the cover body comprises a cover, and an operating device mounted on a top of the cover, the cover defines an indentation, two resilient members are mounted to two ends of the indentation, the collapsible warning frame comprises a fixing plate mounted to the indentation, a first frame rotatably coupled to one end of the indentation, and a second frame rotatably coupled to other end of the indentation, the first frame and the second frame are received in the indentation and compress the two resilient members in the first position, the operating device urges the first frame and the second frame into a collapsed state, and when the operating device is separated from the collapsible warning frame, the two resilient members are restored to move the first frame and the second frame upward to the second position.

2. The warning device of claim 1, wherein a first raised platform is formed at a side wall of the indentation, a second raised platform is formed on a front wall of the first raised platform, the fixing plate is coupled to a front side wall of the second raised platform, the first frame is located on a top of the second raised platform, and the second frame is located on a top of the first raised platform.

3. The warning device of claim 2, wherein one end of the second raised platform defines a first receiving slot running through the first raised platform, the other end of the second raised platform defines a second receiving slot, each resilient member comprises an resilient portion, a first resilient rod coupled to one end of the resilient portion, and a second resilient rod coupled to the other end of the resilient portion, the resilient portions and second resilient rods of the two resilient members are respectively received in the first receiving slot and the second receiving slot, the first resilient rods of the two resilient members respectively urge the first frame and the second frame towards a expanded position.

4. The warning device of claim 3, wherein a left end of a bottom wall of the first frame defines a first notch to lock the first resilient rod of one of the two resilient members, and a right end of a bottom wall of second frame defines a second notch to lock the first resilient rod of the other of the two resilient members.

5. The warning device of claim 1, wherein a left end of the cover defines a recess communicating with the indentation, and a part of the operating device is pivotably mounted in the recess.

6. The warning device of claim 5, wherein a bottom wall of the recess defines a first locking hole and two spaced second locking holes, the operating device comprises a head portion and an operating portion coupled to the head portion, a post protrudes from a bottom of the head portion configured to be rotatably locked in the first locking hole, a protrusion protrudes from a bottom of the operating portion, when the protrusion is locked in the right second locking hole, the operating portion urges the collapsible warning frame into the locked position, and when the protrusion is locked in the left second locking hole, the operating portion is opened into the using position from the collapsible warning frame.

7. The warning device of claim 1, wherein a left end of the first frame defines a through hole, a post protrudes from a left end of the fixing plate configured to be rotatably locked in the through hole of the first frame.

8. The warning device of claim 1, wherein the right end of the indentation defines a mounting hole, a post protrudes from a right end of the second frame configured to be rotatably locked in the mounting hole.

9. The warning device of claim 1, wherein the collapsible warning frame further comprises two positioning blocks, a right end of the first frame defines a first positioning slot, a left end of the second frame defines a second positioning slot, two magnets are mounted in the first positioning slot and the second positioning slot, and when the first frame and the second frame are unfolded in the second position, the fixing plate, the first frame and the second frame cooperatively form a triangle, the magnets in the positioning blocks attract each other.

10. The warning device of claim 1, wherein warning LEDs are mounted to the fixing plate, the first frame and the second frame.

11. A warning device comprising:
a base comprising a controller;
a cover body mounted on the base, an operating device mounted on a top of the cover body; and
a collapsible warning frame mounted to the cover body, and capable of being folded in the cover body in a first position and unfolded out of the cover body in a second position by operating the operating device;
wherein two wheels are mounted to two side of the base, the controller is configured to control the wheels to move the warning device, the cover body comprises a cover, and an operating device mounted on a top of the cover, the cover defines an indentation, two resilient members are mounted to two ends of the indentation, the collapsible warning frame comprises a fixing plate mounted to the indentation, a first frame rotatably coupled to one end of the indentation, and a second frame rotatably coupled to other end of the indentation, the first frame and the second frame are received in the indentation and compress the two resilient members in the first position, the operating device urges the first frame and the second frame into a collapsed state, and when the operating device is separated from the collapsible warning frame, the two resilient members are restored to move the first frame and the second frame upward to the second position.

12. The warning device of claim 11, wherein a first raised platform is formed at a side wall of the indentation, a second raised platform is formed on a front wall of the first raised platform, the fixing plate is coupled to a front side wall of the second raised platform, the first frame is located on a top of the second raised platform, and the second frame is located on a top of the first raised platform.

13. The warning device of claim 12, wherein one end of the second raised platform defines a first receiving slot running through the first raised platform, the other end of the second raised platform defines a second receiving slot, each resilient member comprises an resilient portion, a first resilient rod coupled to one end of the resilient portion, and a second resilient rod coupled to the other end of the resilient portion, the resilient portions and second resilient rods of the two resilient members are respectively received in the first receiving slot and the second receiving slot, the first resilient rods of the two resilient members respectively urge the first frame and the second frame towards a expanded position.

14. The warning device of claim 13, wherein a left end of a bottom wall of the first frame defines a first notch to lock the first resilient rod of one of the two resilient members, and a right end of a bottom wall of second frame defines a second notch to lock the first resilient rod of the other of the two resilient members.

15. The warning device of claim 11, wherein a left end of the cover defines a recess communicating with the indentation, and a part of the operating device is pivotably mounted in the recess.

16. The warning device of claim 15, wherein a bottom wall of the recess defines a first locking hole and two spaced second locking holes, the operating device comprises a head portion and an operating portion coupled to the head portion, a post protrudes from a bottom of the head portion configured to be rotatably locked in the first locking hole, a protrusion protrudes from a bottom of the operating portion, when the protrusion is locked in the right second locking hole, the operating portion urges the collapsible warning frame into the locked position, and when the protrusion is locked in the left second locking hole, the operating portion is opened into the using position from the collapsible warning frame.

17. The warning device of claim 11, wherein a left end of the first frame defines a through hole, a post protrudes from a left end of the fixing plate configured to be rotatably locked in the through hole of the first frame.

18. The warning device of claim 11, wherein the collapsible warning frame further comprises two positioning blocks, a right end of the first frame defines a first positioning slot, a left end of the second frame defines a second positioning slot, two magnets are mounted in the first positioning slot and the second positioning slot, and when the first frame and the second frame are unfolded in the second position, the fixing plate, the first frame and the second frame cooperatively form a triangle, the magnets in the positioning blocks attract each other.

* * * * *